United States Patent [19]
Peele et al.

[11] Patent Number: 5,561,431
[45] Date of Patent: Oct. 1, 1996

[54] WAVELET TRANSFORM IMPLEMENTED CLASSIFICATION OF SENSOR DATA

[75] Inventors: Larry Peele, Orlando; Charles Stirman, Maitland, both of Fla.

[73] Assignee: Martin Marietta Corporation, Bethesda, Md.

[21] Appl. No.: 327,548

[22] Filed: Oct. 24, 1994

[51] Int. Cl.$^6$ .................................................. G01S 7/41
[52] U.S. Cl. ........................ 342/90; 342/192; 342/193; 342/196
[58] Field of Search ........................ 342/90, 192, 193, 342/189, 195, 196

[56] References Cited

U.S. PATENT DOCUMENTS

| | | | |
|---|---|---|---|
| 5,245,587 | 9/1993 | Hutson | 367/100 |
| 5,379,268 | 1/1995 | Hutson | 367/100 |

OTHER PUBLICATIONS

D. Legitimus and L. Schwab, "Natural underwater sounds indentification by neural networks and classical techniques of classification", *Revue Technique Thomson–CSF*, vol. 23, No. 1, Mar. 1991, pp. 161–184.

P. Flandrin et al., "Generalized Target Description and Wavelet Decompositon", *IEEE Transactions on Acoustics, Speech, and Signal Processing*, vol. 38. No. 2, Feb. 1990, pp. 350–352.

J. D. Meloy, "The Feasibility of Pulse Signal Classification by Spectral Parameters" (Masters Thesis) Naval Postgraduate School Monterey, CA, Dec. 1973, pp. 1–95.

Duda and Hart, Pattern Classification and Scene Analysis, pp. 22–32 (John Wiley and Sons 1993).

*Primary Examiner*—John B. Sotomayor
*Attorney, Agent, or Firm*—Burns, Doane, Swecker & Mathis, L.L.P.

[57] ABSTRACT

An improved classifier estimates a classification of a sensed object. Data representing the sensed object are received by a sensor, such as a radar, and transformed into wavelet transform coefficients. A subset of the wavelet transform coefficients are selected, the number of coefficients in the subset being fewer in number than the size of the original data. The subset of wavelet transform coefficients is then used in place of the original data by a classifier that generates the classification of the sensed object. The classifier may be a correlation (profile matching) classifier or a quadratic classifier. In another embodiment of the invention, a wavelet fusion classifier further improves classifier performance by taking data from a single sensor, and transforming it into a reduced subset of wavelet transform coefficients for use with a correlation classifier, and also transforming the data into a reduced subset of wavelet transform coefficients for use with a quadratic classifier. These respective reduced subsets of wavelet transform coefficients are supplied to corresponding correlation and quadratic classifiers. A confidence level is determined for the output of each of the correlation and quadratic classifiers. The output of the classifier having the highest confidence level is then selected as the estimated classification of the sensed object.

20 Claims, 4 Drawing Sheets

WAVELET TRANSFORM IMPLEMENTED CLASSIFICATION OF SENSOR DATA

BACKGROUND

The present invention relates to a classifier for sensor data, and more particularly to a method and apparatus for quickly and accurately classifying objects using sensor data.

Methods of remotely sensing objects are well known. Such methods include, for example, radar, sonar, and the use of infrared, acoustic and optical sensing devices. In most radar applications, the only properties of the target (i.e., the object being sensed) that are measured are its radial velocity and its location in range and angle, so that the only thing known about the target is its physical presence in space. However, it is possible to extract more information about the target which would permit the radar to distinguish one type of target from another, such as distinguishing between a tank and a truck. This capability is known as target classification.

Techniques for obtaining data of sufficient quality to permit target classification are well known in the art, and include, for example, High-range-resolution (HRR) with polarization diversity, engine modulations, cross-section fluctuations, synthetic aperture radar (SAR), and others. These well-known techniques are described, for example, in the textbook M. Skolnik, "Introduction to Radar Systems" Second Edition 434–440 (McGraw-Hill Publishing Company 1980), as well as in D. Wehner, "High Resolution Radar" (Artech House 1987). The entire texts of the Skolnik and Wehner publications are incorporated herein by reference.

In addition to collecting sensed data of appropriate quality, target classification requires that some method of signal recognition or pattern recognition be applied to be able to correctly estimate the type of target. An algorithm or apparatus that performs this analysis is called a "classifier".

It is a goal to devise an optimal classifier algorithm within the cost, time, weight and price constraints of the system, as well as one that can classify targets as accurately as the statistical uncertainties of the sensor data will allow. Such uncertainties can arise, for example, from small changes in radar-to-target viewing aspect angle, clutter, interference, fluctuations in target return due to scattering or reflecting centers, and unknown a priori knowledge of actual targets. In practice, however, the design of an "optimal" classifier is often unknown, generally because of lack of information about what particular statistical distribution the actual target data will follow. Furthermore, processing limitations imposed by the choice of computer architecture or available time or weight or power may require compromises in classifier design that prevent one from even approaching the results that could be achieved by an "optimal" classifier. Consequently, the lack of knowledge about what constitutes an "optimal" classifier design and the need to design around computer limitations both present major obstacles which must be overcome in designing an appropriate classifier for a particular sensor.

A number of classifiers are presently known in the art. One of these, called a correlation or profile matching classifier, operates by comparing sensor data from an unknown target to a battery of stored data "profiles" of known targets. The known target profile which most highly correlates with the unknown target data is finally selected as the output of the classifier. That is, "training" data vectors $C_1^1, C_2^1, \ldots, C_N^1$ exist for class 1, and data vectors $C_1^2, C_2^2, \ldots, C_N^2$ exist for class 2. Typically, these vectors are normalized by converting $C_j^i$ to $C_j^i/\|C_j^i\|$, where $\|\ \|$ indicates the Euclidean norm. Consequently, the resulting training vectors all have norm one. Then, for an input vector C, one classifies C as a class 1 object if $$\underset{j}{\text{minimum}}\ \|C - C_j^1\| < \underset{j}{\text{minimum}}\ \|C - C_j^2\|$$

or equivalently, if $\underset{j}{\text{maximum}}\ C^t C_j^1 > \underset{j}{\text{maximum}}\ C^t C_j^2$, where $C^t$. is the transpose of the vector C.

Another type of classifier that is well-known in the art is called a quadratic classifier, which mathematically analyzes HRR profiles of the unknown target to determine the classification of the target based on a quadratic discriminant function. This type of well-known classifier is described, for example, in R. O. Duda & P. E. Hart, "Pattern Classification and Scene Analysis" pp. 22–32 (John Wiley & Sons 1973), which is incorporated herein by reference.

Classification accuracy has been improved, in the prior art, by the use of a sensor fusion classifier. This technique involves obtaining the outputs from independent sensors, each sensing the same target. The independent sensors may be of different types (e.g., one radar and one infrared), or they may be of the same type so long as the data collected from one sensor is independent of the data collected from any other sensor (e.g., by having each sensor collect data from a unique aspect angle). Each sensor's output data is then run through a classifier (e.g., correlation or quadratic) to produce two independently determined estimates of the target's classification. For example, the output of one classifier, operating on a first sensor's data, may conclude that the target is a tank. Furthermore, the output of a second classifier, operating on a second sensor's data, may conclude that that same target is a truck. For each of these estimates, a statistical level of confidence, usually based on a calculation of probability, is calculated, and the most confident target classification estimate is selected as the output of the sensor fusion classifier. This technique has yielded a 6–10% improvement in classification accuracy, compared with a quadratic classifier.

It is important, for proper functioning of the prior art sensor fusion classifier, that the input target data be collected from two independent sensors. This is necessary because meaningful differences in target classification estimates using prior art classifiers can only be generated when the data that is supplied to one of the classifiers is independent of the data that is supplied to the other classifier. Attempts to simply supply the same sensor data to two different types of classifiers (i.e., one correlation classifier and one quadratic classifier) have only resulted in classification estimates of comparable confidence from the two classifiers, yielding no improvement in accuracy, and needlessly increasing computation time.

A major drawback to the use of each of the above classifiers is the fact that each needs to perform highly complex mathematical operations on a great deal of data in order to generate accurate results. Sensors, such as radar, are capable of generating data very quickly, so the information necessary for accurately classifying a target can be obtained in real time. However, the goal of real time target classification is impeded by the fact that processors that satisfy the typical cost, weight, power and size requirements are incapable of running any of the classifier algorithms fast enough to keep up with the ongoing data stream. This problem is especially acute for correlation classifiers, which can require many times more computations than quadratic classifiers. Consequently, compromises have been made which reduce the amount of computation needed to produce an output. For example, it is possible to have a correlation classifier compare the unknown target data to a smaller number of known target profiles. However, this necessarily leads to a comparable degradation in target classification accuracy. Similar compromises with quadratic classifiers involve decreasing the dimension of the test vector by a factor of, for example, two, which will cut the number of required computations by approximately a factor of four. However, some classifier accuracy may also be lost.

SUMMARY

It is therefore an object of the present invention to provide a classifier that is capable of estimating the class of an unknown target with greater speed than in prior art classifiers.

It is a further object of the present invention to provide a classifier that is capable of estimating the class of an unknown target with greater accuracy than is practical and possible in prior art classifiers.

In accordance with one aspect of the present invention, the foregoing and other objects are achieved in a classifier comprising input means for receiving sensor data representing a sensed object. Transform means are coupled to the input means, for transforming the sensor data into a number of wavelet transform coefficients. A first subset of wavelet transform coefficients is then subselected from the number of wavelet transform coefficients. Classification processing means then generate, from the first subset of wavelet transform coefficients, a classification signal indicative of a classification of the sensed object.

In accordance with another aspect of the invention, the classification processing means estimates the classification by comparing the first subset of wavelet transform coefficients to each of a plurality of stored known subsets of wavelet transform coefficients, each stored known subset corresponding to one of a plurality of known classifications. Then, the classification processing means generates the classification signal by selecting a most closely matching one of the plurality of known classifications that corresponds to a most closely matching known subset of wavelet transform coefficients.

In accordance with yet another aspect of the invention, the classification processing means is a quadratic classifier (i.e., one that uses a quadratic discriminant function to perform classification).

In another embodiment of the present invention, two classifiers of differing types operate in parallel, each classifying an object based on the same input sensor data. An output is then selected from that classifier which has a higher confidence level. Thus, a classifier in accordance with this embodiment comprises input means for receiving sensor data signals representing a sensed object. First transform means are coupled to the input means, for transforming the sensor data signals into a plurality of first wavelet transform coefficients suitable for use in a first classification processing means. First subselection means generate a first subset of wavelet transform coefficients, the first subset comprising at least one of said plurality of first wavelet transform coefficients. First classification processing means generate, from the first subset of wavelet transform coefficients, a first classification signal indicative of a first classification of said sensed object. The first classification processing means comprises means for comparing the first subset of wavelet transform coefficients to each of a plurality of stored known subsets of wavelet transform coefficients, each stored known subset corresponding to one of a plurality of known classifications; and means, coupled to the comparing means, for generating the first classification signal by selecting a most closely matching one of the plurality of known classifications that corresponds to a most closely matching known subset of wavelet transform coefficients. The classifier further comprises first confidence level means, coupled to the first classification processing means, for generating a first confidence level signal corresponding to the first classification signal. The classifier further comprises second transform means for transforming the sensor data signals into a plurality of second wavelet transform coefficients suitable for use in a second classification processing means. Second subselection means then generate a second subset of wavelet transform coefficients, the second subset comprising at least one of the plurality of second wavelet transform coefficients. Second classification processing means generate, from the second subset of wavelet transform coefficients, a second classification signal indicative of a second classification of the sensed object, wherein the second classification processing means is a quadratic classifier. Second confidence level means, which are coupled to the second classification processing means, generate a second confidence level signal corresponding to the second classification signal. Finally, means, coupled to the first and second classification processing means and to the first and second confidence level means, determine which of the first and second confidence level signals indicates a higher confidence level, and then provide as an output of the classifier a selected one of the first and second classification signals corresponding to the determined higher confidence level.

In other aspects of the invention, the sensor data may alternatively be radar, acoustic, sonar, infrared or optical data. In the case of the radar, acoustic and sonar data, one dimensional wavelet transforms are used, whereas in the case of infrared or optical data, two dimensional wavelet transforms are used.

BRIEF DESCRIPTION OF THE DRAWINGS

The objects and advantages of the invention will be understood by reading the following detailed description in conjunction with the drawings in which.

DETAILED DESCRIPTION

Figure 1:
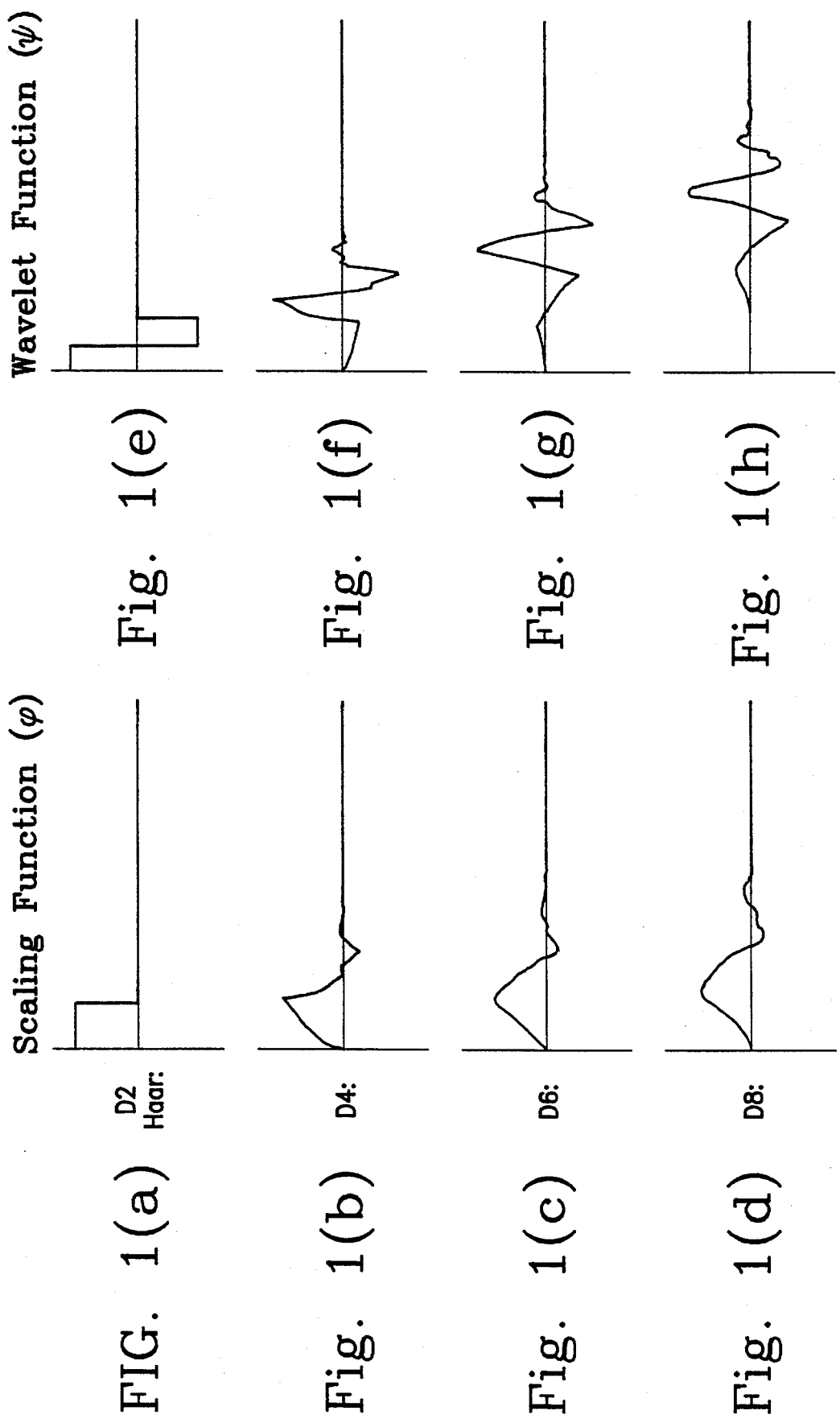
FIGS. 1(a)–1(h) illustrate a number of scaling functions and corresponding compactly supported, orthonormal wavelet functions.

The present invention relies on a transformation of sensor data having a first dimensional size into a corresponding set of data having reduced dimensions. This transformed data is then applied to one or more classifiers in accordance with the various embodiments described below, in order to produce more accurate target classifications in less processing time compared to the prior art techniques.

The transformation relied upon in this invention is called a wavelet transform. Wavelet transforms are mathematical transformations whose theory was recently (1986–1987) derived by Dr. Ingrid Daubechies, Dr. S. Mallat, Dr. R. Coifman and others. Their work is described in various publications, including I. Daubechies, "Orthonormal Bases of Compactly Supported Wavelets," Communication in Pure and Applied Mathematics, vol. XLI (1988); R. R. Coifman & M. V. Wickerhauser, "Entropy Based Algorithms for Best Basis Selection", IEEE Transactions on Information Theory, vol. 32, pp. 712–718; R. R. Coifman et al., "Wavelet Analysis and Signal Processing," Wavelets and Their Applications pp. 153–178 (M. B. Ruskai ed., Jones and Bartlett 1992); S. G. Mallat, "Multiresolution Approximation and Wavelet Orthonormal Bases of $L^2(R)$," Transactions of AMF pp. 69–87, vol. 315 (1989) (hereinafter referred to as Mallat, "Multiresolution Approximation"); and S. G. Mallat, "A Theory for Multiresolution Signal Decomposition: The Wavelet Decomposition," IEEE Transactions on PAMI, vol. 11, pp. 674–693 (1989). The entire texts of the above-cited publications are incorporated herein by reference. Wavelet transforms have been shown to be useful in data, image, and audio compression applications as well as other data filtering operations. Such applications are characterized by the fact that wavelet transforms are used merely for the purpose of reducing the size of data that is to be stored or transmitted. When it is desired to access the original informational content of the reduced data, however, the inverse wavelet transform must first be produced in order to recreate the original data with minimal distortion.

The continuous time version of the wavelet transform is determined by the following equation:

$$c_{a,b}(f) = |a|^{-1/2} \int_{-\infty}^{+\infty} f(t)\, w\left(\frac{t-b}{a}\right)\, dt$$

where a,b are real numbers with $a \neq 0$, and w is the "basic wavelet."

The discrete wavelet transform is $$C_{n,m}(f) = 2^{-\frac{n}{2}} \int_{-\infty}^{\infty} f(t)\, w\left(\frac{t}{2^n} - m\right) dt$$

where n,m are integers.

Wavelets and wavelet packets are mathematical functions which can be generated recursively by simple computational algorithms. See, for example, Mallat, "Multiresolution Approximation" (cited and incorporated by reference above). Scaling functions are mathematical functions that are solutions to particular recursion equations. The recursion equations are related to orthogonal projection theory in Hilbert space. The wavelet functions are derived from the scaling functions. Shifts and dilations of the wavelet functions lead to an orthonormal basis of wavelet functions in Hilbert space. Particular scaling functions and their corresponding wavelet function orthonormal bases are generally selected based on their matching the phenomena or data of interest in size, shape, or both. FIGS. 1(a)–1(d) represent a few scaling functions, and FIGS. 1(e)–1(h) represent a few of the corresponding compactly supported, orthonormal wavelet functions. Compact support means that the functions have non-zero values over a finite interval, so that a signal can be adequately represented with a relatively small number of coefficients. Consequently, sharp details are maintained without smoothing. Such would not be the case with other transforms, such as the Fourier transform, which uses sine waves that have infinite support. Each wavelet function has the remarkable property that its translates and rescaled versions form an orthonormal basis for all signals with finite power. The process of matching a signal to this particular shape at many scales and locations is called multiresolution or wavelet analysis, and is described, for example, in the Mallat, "Multiresolution Approximation" reference. Essentially, this process comprises a wavelet transform step, followed by rank-sorting the magnitudes of the wavelet coefficients. The coefficients obtained from this matching process can be used to synthesize the original signal or to extract information, such as transients, discontinuities, or noise. In the automatic target recognition (ATR) application, only the most relevant wavelet coefficients are used to train a target classifier, thereby reducing the complexity of the problem. Training a classifier is well known in the art, and is not described here in detail.

Figure 2:
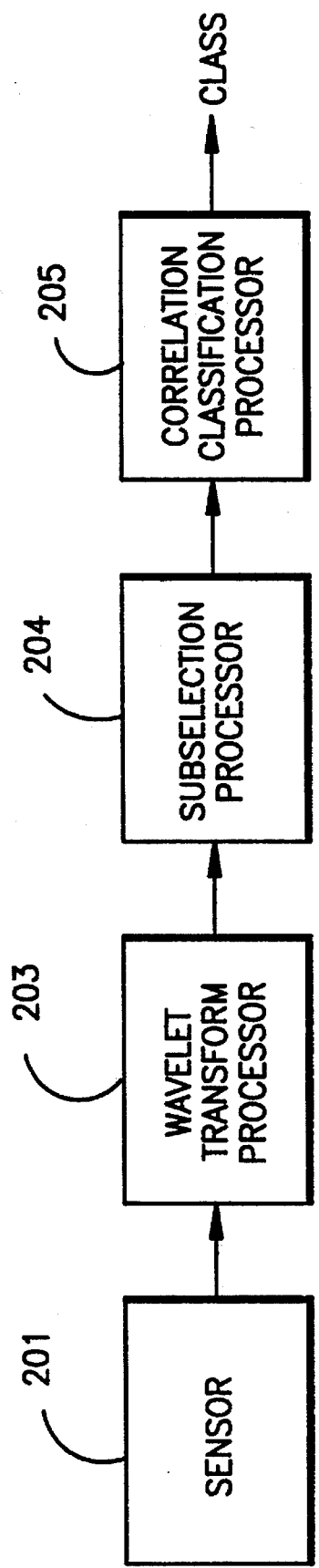
FIG. 2 is a block diagram of a first embodiment of the present invention.

Referring now to FIG. 2, a first embodiment of the present invention, which improves on the performance of conventional correlation classifiers, will now be described. A sensor 201, such as a radar, senses a target (not shown), and generates sensor data, such as HRR profiles, comprising mathematical vectors of many numbers representing the magnitude of the down range position of the target. The sensor data is then supplied to a wavelet transform processor 203, which may be a general purpose computer programmed to perform the wavelet transform on the sensor data in accordance with the recursive formula described above. For a particular application, choosing a particular wavelet basis to use is still an art. Preferably, selection of a wavelet basis is made by choosing a wavelet shape that is similar in appearance to the phenomenon being analyzed. For example, in an application having short data vectors, the D2 scaling function of FIG. 1(a) would be appropriate because it is the shortest scaling function. Thus, the D2 wavelet of FIG. 1(a) would be a good selection for use with radar signals, because it is capable of modeling very abrupt changes within a signal. The transformed data that is output by the wavelet transform processor 203 is then applied to a subselection processor 204. The purpose of the subselection processor is to select a subset of coefficients (also referred to as "down selecting") that will adequately represent the original data. The criterion for wavelet coefficient down selection is usually the selection of those coefficients that are paired with wavelet function shift-dilations that are likely to contain meaningful target location-shape information. For example, the shape and location of a tank's turret might be important. The down selecting process is important for the production of good classification results. In the case of classification based on radar data, a starting point for the down selection process is preferably the knowledge of the characteristics of radar returns for particular targets. That is, the radar return characteristics should suggest that certain wavelet coefficients will be more important for target classification than others. In experiments made by the inventors, particular selections of wavelet coefficients were then made based upon many computer experiments utilizing radar target data. The output of the subselection processor 204 is a data set that is considerably smaller in size (i.e., it has fewer dimensions) than the input data.

The transformed data is then supplied to a correlation classification processor 205 which operates in a manner similar to that which is taught in the prior art. That is, the correlation classification processor 205 receives the transformed data, and compares it to a stored set of transformed data vectors derived from sensing objects of known class. The known class having the highest correlation to the input transformed data is then output as the estimated class of the unknown target. A full description of how to make a correlation classification processor is beyond the scope of this description. However, the correlation classification processor 205 differs from prior art correlation classifiers only in the type of data that is being compared. Consequently, one having ordinary skill in the art will readily be able to program a computer to perform this function.

Figure 3:
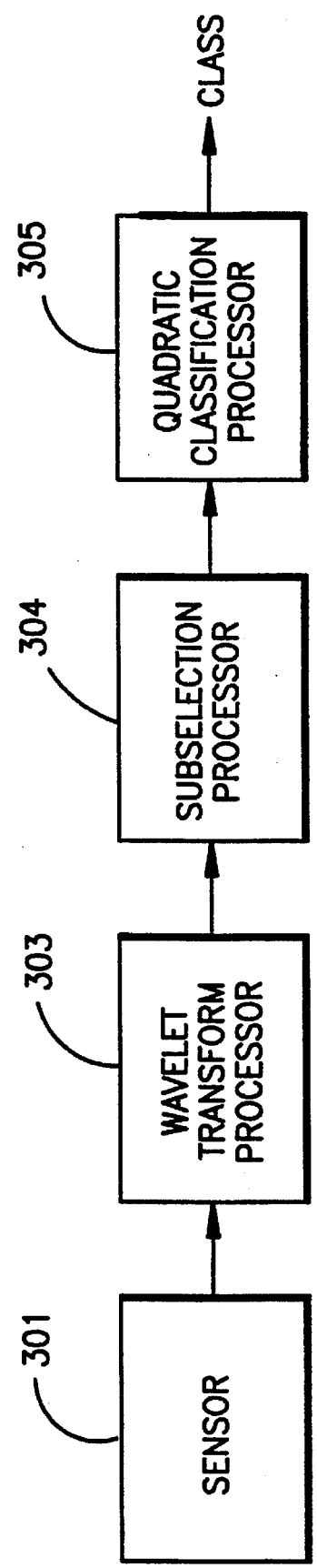
FIG. 3 is a block diagram of a second embodiment of the present invention.

A second embodiment of the present invention, which improves on the performance of conventional quadratic classifiers, will now be described with reference to FIG. 3. A sensor 301, such as a radar, senses a target (not shown), and generates sensor data comprising HRR profiles. Again, the sensor data is quite voluminous. The sensor data is then supplied to a wavelet transform processor 303, which may be, for example, either a digital signal processor, a dedicated processor or a general purpose computer programmed to perform the wavelet transform on the sensor data in accordance with the recursive formula presented above. The selection of the particular wavelet basis is made in accordance with the principles discussed above with respect to the embodiment of FIG. 2. The transformed data that is output by the wavelet transform processor 303 is then applied to a subselection processor 304. The purpose of the subselection processor is to select a subset of coefficients (i.e., "down selecting") that will adequately represent the original data. The dimensionality of the data for use with a correlation processor may or may not differ from that which is used with a quadratic classifier. In the case of the FUSE classifier of FIG. 5, the dimensionality of the wavelet transformed data differs between the two types of classifiers, and the subselection processor 304 makes different subselections of coefficients than does the subselection processor 204 (FIG. 2). That is, the respective computational loads of profile matching and quadratic classifiers impose different subselection limitations. If n is the subselection dimension, then quadratic computations are proportional to $n^2$, but the number of computations for profile matching is proportional to n times the number of stored profiles. Also, low signal to interference (S/I) coefficients appear to damage a quadratic classifier more than a profile matching classifier. It is believed that these differences provide some independence between the classifiers and enhance the performance of the selector 413. The output of the subselection processor 304 is a data set that is considerably smaller in size (i.e., it has fewer dimensions) than the input data.

The data that is output from the subselection processor 304 is then supplied to a quadratic classification processor 305 which operates in a manner similar to that which is taught in the prior art, such as that which is described in the Duda and Hart publication that was cited above and incorporated by reference. A full description of how to make a quadratic classification processor is beyond the scope of this description. However, the quadratic classification processor 305 differs from prior art quadratic classifiers only in the type of data that is being compared. Consequently, one having ordinary skill in the art will readily be able to, for example, program a computer, or design special purpose hardware to perform this function.

Figure 4:
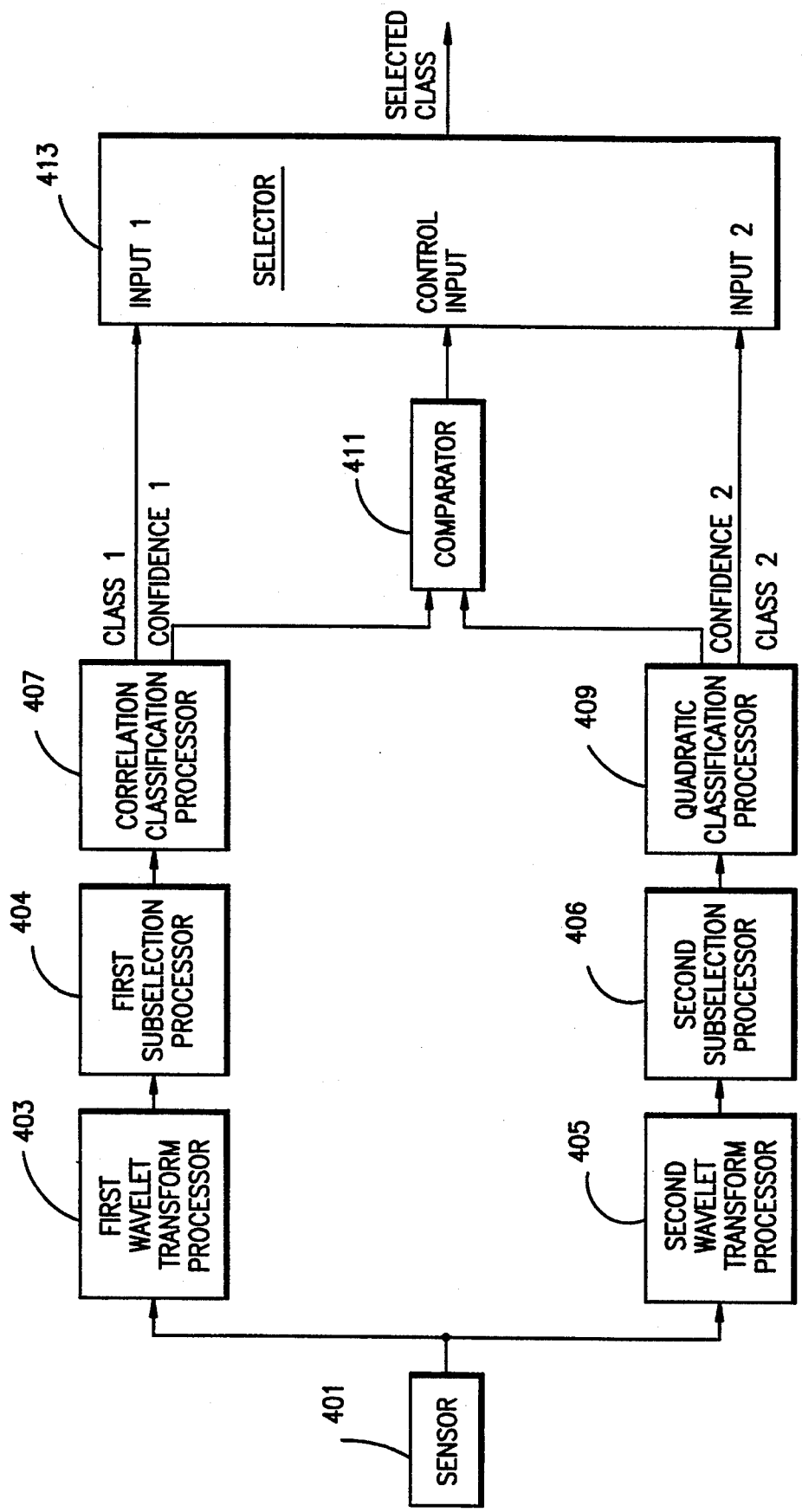
FIG. 4 is a block diagram of a third embodiment of the present invention.

Referring now to FIG. 4, a third embodiment of the present invention will now be described. This embodiment, which is referred to as a wavelet fusion classifier, is similar to the prior art sensor fusion classifier in that two independent paths are used for estimating the target classification, and the one having a highest level of confidence is selected for output. However, the wavelet fusion classifier differs from the prior art in two significant aspects. First, as with the previous two embodiments, data from a sensor is transformed by application of a wavelet transform and then compressed by down selecting the relevant coefficients before being supplied to a classification processor. Consequently, the classification processor is capable of operating faster while maintaining probability levels for correct classification. Second, the wavelet fusion classifier requires only a single source of sensor data. As previously explained, the prior art sensor fusion classifier requires at least two sources of sensor data before the outputs from the corresponding two or more classifiers will be independent of one another. This independence permits an improvement in classification accuracy by selecting the output of a classifier having the greatest level of confidence. However, in accordance with the present invention, some independence in classification can be achieved by starting with sensor data from only a single source, applying an appropriate wavelet transform and subselection process to this data (in correspondence with the type of classifier to be used), and applying the transformed data to two different types of classifiers. Further, the wavelet transforms need not be the same in the two independent paths. Some of the required independence is achieved by using two different types of classifiers with different subselection of data. Further independence in the wavelet fusion classifier is attributable to the fact that a different set of wavelet coefficients is produced by each of the two subselection paths.

Therefore, the wavelet fusion classifier of FIG. 4 has a single sensor 401 which supplies data, such as radar data, to both a first wavelet transform processor 403 (64 point) and a second wavelet transform processor 405 (32 point). The output of the first wavelet transform processor 403 is supplied to a first subselection processor 404 having an output coupled to a correlation classification processor 407. Consequently, the first subselection processor 403 supplies eleven wavelet coefficients to the correlation classification processor 407. Similarly, the output of the second wavelet transform processor 405 is supplied to a second subselection processor 406 having an output coupled to a quadratic classification processor 409, so the second subselection processor 406 is designed to supply eight wavelet coefficients to the quadratic classification processor 409. As with the first and second embodiments of the present invention (see FIGS. 2 and 3), one having ordinary skill in the art can readily design the first and second wavelet transform processors 403, 405 as well as the correlation and quadratic classification processors 407, 409 by, for example, programming a general purpose digital computer to perform these tasks, or by designing special purpose hardware to perform these functions.

Each of the correlation classification processor 407 and the quadratic classification processor 409 produces an output representing the level of confidence in the classification output. A suitable level of confidence may be generated for each classifier by determining the difference $CL_{chosen} - CL_{other}$, where $CL_{chosen}$ refers to the classifier's computed value for the selected class, and $CL_{other}$ is the computed value for the non-selected class. A small difference indicates a close call, and lack of confidence in the output of the classifier. The confidence measures for the two types of classifiers used in the wavelet fusion classifier should be the same or nearly the same magnitude as one another. Each of these confidence level signals is supplied to corresponding inputs of a comparator 411, whose output indicates which of the two classification processors has a higher level of confidence. This comparator output is then supplied to a control input of a selector 413. The selector 413 has two inputs, each connected to a corresponding one of the outputs from either the correlation classification processor 407 or the quadratic classification processor 409. This arrangement permits the output of the selector 413 to have a signal indicating the estimated target classification from the classification path that had the highest level of confidence. Of course, the comparator 411 and the selector 413 need not be discrete physical entities, as shown, but may also be implemented by an appropriate set of instructions for controlling a general purpose digital computer.

In tests of the above three radar embodiments of the present invention, the particular wavelets used were the ones shown in FIG. 1(e), although any one of the other wavelets (FIGS. 1(f) and 1(g)), or a combination of wavelets could have been used. An improved correlation classifier in accordance with the present invention was tested in which input HRR profiles comprising 32 odd and 32 even 1-foot cells (designated here as HR64) were transformed to produce 11 wavelet coefficients to be analyzed by a correlation classification processor. This improved correlation classifier was tested by comparing each input profile from an unknown target with 160 "training" profiles, obtained at every 2.25 degrees of aspect. It is expected that an increase in the number of profiles would increase performance.

Also, an improved quadratic classifier in accordance with the present invention was tested in which input HRR profiles comprising 16 odd and 16 even 1-foot cells (designated here as HR32) were transformed and then down selected to produce 8 wavelet coefficients to be analyzed by a quadratic classification processor.

Because the improved correlation classifier and the improved quadratic classifier produce independent results, these two were able to be combined to form a wavelet fusion classifier, as shown in FIG. 4, which yielded improvement over each individual classifier.

Results from tests of the above three embodiments were compared to the performance of two conventional quadratic classifiers, one using HR64 profiles, and the other using HRR profiles comprising 16 odd and 16 even 1-foot cells (designated HR32). Results from all of the above tests are shown below in Table 1, and also plotted on the graph in FIG. 5. In both the table and the graph, HR64=performance of conventional HRR profile quadratic classifier using 32 odd and 32 even cells (total of 64 cells).

HR32=performance of conventional HRR profile quadratic classifier using 16 odd and 16 even cells (total of 32 cells).

W8=performance of improved quadratic classifier in accordance with the present invention, using 8 wavelet coefficients as indicated above.

PM11=performance of improved correlation (performance matching) classifier in accordance with the present invention, using 11 wavelet coefficients as indicated above.

FUSE=performance of wavelet fusion classifier, selecting the most confident output from the outputs of the PM11 classifier and the W8 classifier.

The radar data used in this study was coherent data that yielded one foot fine range resolution. The two target classes were M60 tank and M35 truck. The wavelet coefficient features that were selected for use in W8 above are the following. The supports of the wavelet functions that yield wavelet coefficients 1 through 32 (if the range profile is ordered by 16 odd front-to-rear and then 16 even rear-to-front) are as follows. Low numbered features have long wavelengths and low frequency. High numbered features have short wavelengths and high frequency. Feature 1 corresponds to the scaling function (FIG. 1(a)) and feature 2 corresponds to the wavelet function (FIG. 1(b)) from the D2 wavelet basis. The other features correspond to wavelet coefficients calculated in the usual manner.

| Coefficients | Cells |
| --- | --- |
| 1, 2 | all 16 odd and 16 even one foot range cells |
| 3, 4 | all 16 odd cells, all 16 even cells |
| 5, 6 | front, rear, 8 odd cells each |
| 7, 8 | rear, front, 8 even cells each |
| 9 to 12 | from front to rear, 4 odd cells each |
| 13 to 16 | from rear to front, 4 even cells each |
| 17 to 24 | from front to rear, 2 odd cells each |
| 25 to 32 | from rear to front, 2 even cells each. |

The specific coefficients used in W8 are 1, 2, 3, 4, 5, 8, 15 and 16.

The wavelet coefficient features that were selected for use in PM11 above are the following. The supports of the wavelet functions that yield wavelet coefficients 1 through 64 (if the range profile is ordered by 32 odd front-to-rear and then 32 even rear-to-front) are as follows. Low numbered features have long wavelengths and low frequency. High numbered features have short wavelengths and high frequency. Feature 1 corresponds to the scaling function (FIG. 1(a)) and feature 2 corresponds to the wavelet function (FIG. 1(b)) from the D2 wavelet basis. The other features correspond to wavelet coefficients calculated in the usual manner.

| Coefficients | Cells |
| --- | --- |
| 1, 2 | all 32 odd and 32 even one foot range cells |
| 3, 4 | all 32 odd cells, all 32 even cells |
| 5, 6 | front, rear 16 odd cells each |
| 7, 8 | rear, front 16 even cells each |
| 9 to 12 | front to rear, 8 odd cells each |
| 13 to 16 | rear to front, 8 even cells each |
| 17 to 24 | front to rear, 4 odd cells each |
| 25 to 32 | rear to front, 4 even cells each |
| 33 to 48 | front to rear, 2 odd cells each |
| 49 to 64 | rear to front, 2 even cells each |

The specific coefficients used in PM11 are 2, 3, 4, 8, 15, 16, 19, 30, 31, 59 and 60.

The following results are optimistic by approximately three percentage points due to the perfect registration from target turntable data (i.e., data obtained by sensing a target that is mounted on a very slowly rotating platform). Furthermore, the "interference" added to the targets for classifier "testing" was Gaussian computer generated noise. The decision not to use the first Haar wavelet transform coefficient (not shown), which averages, in PM11 significantly improved the correlation classifier performance in low signal to interference (S/I), due to the fact that the first coefficient is heavily influenced by background interference level.

TABLE 1

| | CLASSIFIER PERFORMANCE - PCC | | | | |
|---|---|---|---|---|---|
| S/I (db) | PCC for HR64 | PCC for HR32 | PCC for W8 | PCC for PM11 | PCC for FUSE |
| signal only | 92 | 87 | 85 | 91 | 90 |
| 8.2 | 78 | 85 | 86 | 88 | 89 |
| 4.3 | 68 | 81 | 84 | 84 | 87 |
| −1.7 | 60 | 72 | 74 | 75 | 81 |
| −4.7 | 55 | 66 | 68 | 71 | 73 |
| −7.7 | 53 | 61 | 61 | 64 | 63 |

Figure 5:
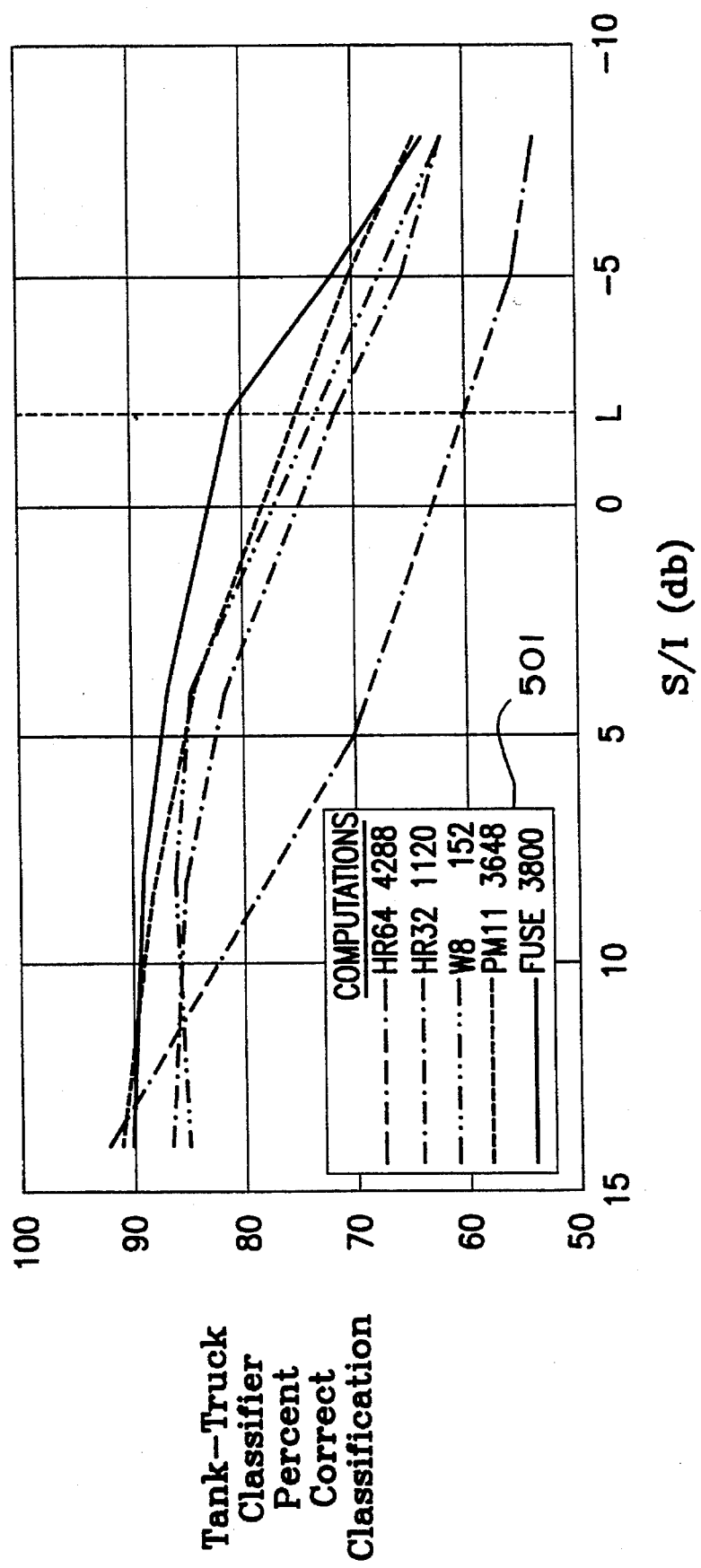
FIG. 5 is a graph illustrating the performance of various embodiments of the present invention compared to prior art classifiers.

An inset table 501 in FIG. 5 shows the number of computations required for each of the tested classifiers. It can be seen from Table 1 and from the graph in FIG. 5 that the feature space resulting from the HRR profile could be reduced considerably without loss of percent correct classification (PCC) at high signal-to-noise ratios which are characteristic of turntable training data. The line labeled L in the graph of FIG. 5 indicates a typical operational limit. It can be seen that as the signal-to-noise ratio decreased, the wavelet-based reduced feature set degraded much less than the conventional approach. This is apparent from a comparison of the plot labeled W8 (eight wavelet features) with the plot labeled HR32 and HR64 as shown in FIG. 5. In this study, the features used by the classifier were particular wavelet coefficients produced by the target HRR profile. The eight wavelet features, W8, dramatically decreased the number of computations required while improving classification performance over two typical quadratic feature sets, HR64 and HR32. The profile matching approach using 11 wavelet coefficients (PM11) provided slightly improved performance over the W8 feature approach. Finally, the wavelet fusion classifier, FUSE, improved classifier performance considerably while requiring no more computation than the HR64.

Based on average PCC over the first four S/I levels shown in Table 1, the new wavelet fusion classifier gives 12.5 percentage points improvement in classification accuracy over a quadratic classifier using 32 feet of odd and 32 feet of even, and 6.3 percentage points improvement in classification accuracy over a quadratic classifier using 16 feet of odd and 16 feet of even. The fusion classifier also can be seen to produce improved PCC when compared to the HR64 or HR32 classifiers at the last two S/I levels, which are beyond the requirements of most radar classifiers.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A classifier comprising:

input means for receiving sensor data signals representing a sensed object;

first transform means for transforming said sensor data signals into a plurality of first wavelet transform coefficients suitable for use in a first classification processing means;

first subselection means for generating a first subset of wavelet transform coefficients, said first subset comprising at least one of said plurality of first wavelet transform coefficients;

first classification processing means for generating, from said first subset of wavelet transform coefficients, a first classification signal indicative of a first classification of said sensed object, wherein said first classification processing means comprises:

means for comparing said first subset of wavelet transform coefficients to each of a plurality of stored known subsets of wavelet transform coefficients, each stored known subset corresponding to one of a plurality of known classifications; and means, coupled to said comparing means, for generating said first classification signal by selecting a most closely matching one of said plurality of known classifications that corresponds to a most closely matching known subset of wavelet transform coefficients;

first confidence level means, coupled to said first classification processing means, for generating a first confidence level signal corresponding to said first classification signal;

second transform means for transforming said sensor data signals into a plurality of second wavelet transform coefficients suitable for use in a second classification processing means;

second subselection means for generating a second subset of wavelet transform coefficients, said second subset comprising at least one of said plurality of second wavelet transform coefficients;

second classification processing means for generating, from said second subset of wavelet transform coefficients, a second classification signal indicative of a second classification of said sensed object, wherein said second classification processing means is a quadratic classifier;

second confidence level means, coupled to said second classification processing means, for generating a second confidence level signal corresponding to said second classification signal; and means, coupled to said first and second classification processing means and to said first and second confidence level means, for determining which of said first and second confidence level signals indicates a higher confidence level, and for providing as an output of said classifier a selected one of said first and second classification signals corresponding to said determined higher confidence level.

2. The classifier of claim 1, wherein the sensor data signals are radar data signals.

3. The classifier of claim 1, wherein the sensor data signals are acoustic data signals.

4. The classifier of claim 1, wherein the sensor data signals are optical sensing device signals.

5. The classifier of claim 1, wherein the sensor data signals are infrared sensing device signals.

6. The classifier of claim 1, wherein the sensor data signals are sonar data signals.

7. A method for classifying an object, comprising the steps of:

sensing said object to produce sensor data signals representing said sensed object;

transforming said sensor data signals into a plurality of first wavelet transform coefficients suitable for use in a first classification signal generating step;

subselecting a first subset of wavelet transform coefficients, said first subset comprising at least one of said plurality of first wavelet transform coefficients;

generating, from said first subset of wavelet transform coefficients, a first classification signal indicative of a classification of said sensed object by comparing said first subset of wavelet transform coefficients to each of a plurality of stored known subsets of first wavelet transform coefficients, each stored known subset corresponding to one of a plurality of known classifications;

determining which of said stored known subsets of first wavelet transform coefficients most closely matches said first subset of wavelet transform coefficients; and selecting a most closely matching one of said plurality of known classifications that corresponds to said most closely matching known subset of wavelet transform coefficients;

generating a first confidence level signal corresponding to said first classification signal;

transforming said sensor data signals into a plurality of second wavelet transform coefficients suitable for use in a second classification signal generating step;

subselecting a second subset of wavelet transform coefficients, said second subset comprising at least one of said plurality of second wavelet transform coefficients;

generating a second classification signal indicative of a second classification of said sensed object by using a quadratic classifier to generate said second classification signal based on said second subset of wavelet transform coefficients;

generating a second confidence level signal corresponding to said second classification signal;

determining which of said first and second confidence level signals indicates a higher confidence level; and generating a classification signal by selecting one of said first and second classification signals corresponding to said determined higher confidence level.

8. The method of claim 7, wherein the sensor data signals are radar data signals.

9. The method of claim 7, wherein the sensor data signals are acoustic data signals.

10. The method of claim 7, wherein the sensor data signals are optical sensing device signals.

11. The method of claim 7, wherein the sensor data signals are infrared sensing device signals.

12. The method of claim 7, wherein the sensor data signals are sonar data signals.

13. A classifier comprising:

input means for receiving sensor data signals representing a sensed object;

transform means for transforming said sensor data signals into a plurality of wavelet transform coefficients suitable for use in a first classification processing means;

subselection means for generating a subset of wavelet transform coefficients, said subset comprising at least one of said plurality of wavelet transform coefficients;

first classification processing means for generating, from said subset of wavelet transform coefficients, a first classification signal indicative of a first classification of said sensed object, wherein said first classification processing means is of a first type;

second classification processing means for generating, from said sensor data signals, a second classification signal indicative of a second classification of said sensed object, wherein said second classification processing means is of a second type that is different from said first type; and selection means, coupled to said first and second classification processing means, for selecting one of said first and second classification signals as an output of said classifier.

14. The classifier of claim 13, wherein the selection means comprises:

first confidence level means, coupled to said first classification processing means, for generating a first confidence level signal corresponding to said first classification signal;

second confidence level means, coupled to said second classification processing means, for generating a second confidence level signal corresponding to said second classification signal; and means, coupled to said first and second classification processing means and to said first and second confidence level means, for determining which of said first and second confidence level signals indicates a higher confidence level, and for providing as an output of said classifier a selected one of said first and second classification signals corresponding to said determined higher confidence level.

15. The classifier of claim 13, wherein said first classification processing means comprises:

means for comparing said subset of wavelet transform coefficients to each of a plurality of stored known subsets of wavelet transform coefficients, each stored known subset corresponding to one of a plurality of known classifications; and means, coupled to said comparing means, for generating said first classification signal by selecting a most closely matching one of said plurality of known classifications that corresponds to a most closely matching known subset of wavelet transform coefficients.

16. The classifier of claim 13, wherein said first classification processing means is a quadratic classifier.

17. A method of classifying an object, comprising the steps of:

sensing said object to produce sensor data signals representing said sensed object;

transforming said sensor data signals into a plurality of wavelet transform coefficients suitable for use in a first classification processing means;

subselecting a subset of wavelet transform coefficients, said subset comprising at least one of said plurality of wavelet transform coefficients;

using a first classification technique to generate, from said subset of wavelet transform coefficients, a first classification signal indicative of a first classification of said sensed object;

using a second classification technique to generate, from said sensor data signals, a second classification signal indicative of a second classification of said sensed object, wherein said second classification technique is different from said first classification technique; and selecting one of said first and second classification signals as an output of said classifier.

18. The method of claim 17, wherein the step of selecting comprises the steps of:

generating a first confidence level signal corresponding to said first classification signal;

generating a second confidence level signal corresponding to said second classification signal; and determining which of said first and second confidence level signals indicates a higher confidence level, and providing as an output of said classifier a selected one of said first and second classification signals corresponding to said determined higher confidence level.

19. The method of claim 17, wherein said first classification technique comprises the steps of:

comparing said subset of wavelet transform coefficients to each of a plurality of stored known subsets of wavelet transform coefficients, each stored known subset corresponding to one of a plurality of known classifications; and generating said first classification signal by selecting a most closely matching one of said plurality of known classifications that corresponds to a most closely matching known subset of wavelet transform coefficients.

20. The method of claim 17, wherein said first classification processing technique comprises the step of using a quadratic classifier to generate the first classification signal.

* * * * *